United States Patent [19]

Hagihara

[11] 4,440,280

[45] Apr. 3, 1984

[54] SPRING CLUTCH MECHANISM

[75] Inventor: Hideaki Hagihara, Moriguchi, Japan

[73] Assignee: Sharp Kabushiki Kaisha, Osaka, Japan

[21] Appl. No.: 287,799

[22] Filed: Jul. 28, 1981

[30] Foreign Application Priority Data

Aug. 1, 1980 [JP] Japan ................................. 55-110559

[51] Int. Cl.³ .......................................... F16D 23/00
[52] U.S. Cl. ................................... 192/36; 192/81 C; 192/41 S
[58] Field of Search ...................... 192/26, 35, 36, 37, 192/81 C, 84 T, 41 S

[56] References Cited

U.S. PATENT DOCUMENTS

| | | | |
|---|---|---|---|
| 2,971,394 | 2/1961 | Christensen | 192/41 S X |
| 3,684,068 | 8/1972 | Ford | 192/84 T |
| 3,837,450 | 9/1974 | Malion et al. | 192/35 X |
| 3,850,275 | 11/1974 | Helander | 192/26 |
| 3,905,458 | 9/1975 | Mehrbrodt | 192/35 X |
| 4,108,544 | 8/1978 | Mitsuyama et al. | 355/50 X |
| 4,193,483 | 3/1980 | Ariga et al. | 192/26 |
| 4,263,995 | 4/1981 | Wahlstedt | 192/35 |
| 4,321,992 | 3/1982 | Gallo | 192/81 C |

*Primary Examiner*—Cornelius J. Husar
*Assistant Examiner*—Joseph A. Fischetti
*Attorney, Agent, or Firm*—Birch, Stewart, Kolasch & Birch

[57] ABSTRACT

A spring clutch mechanism for use in an electrophotographic copying machine includes a first boss connected to a driving shaft and a second boss connected to a driven shaft. The driving shaft and the driven shaft are co-axially disposed so that the two bosses confront each other. A coil spring is disposed around the two bosses. A first sleeve is disposed around the coil spring. One end of the coil spring is fixed to the first boss and the other end of the coil spring is fixed to the first sleeve. A second sleeve is slidably mounted on the first sleeve. A rubber plate is secured to the second sleeve so that the rubber plate confronts the flange of the second boss. In the non-transmitting mode, the first and second sleeves and the coil spring are rotated in unison with the first boss, but the second boss is not rotated. When the second sleeve is depressed toward the flange of the second boss, the rubber plate contacts the flange to brake the rotation of the second and first sleeves. Thus, the coil spring is tightly bound around the first and second bosses to transfer the rotation of the first boss to the second boss.

5 Claims, 7 Drawing Figures

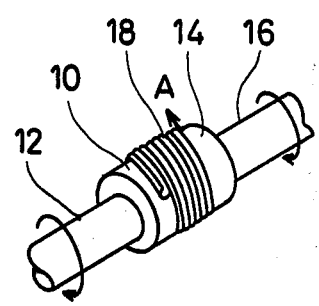
FIG.1 PRIOR ART
FIG.2 PRIOR ART
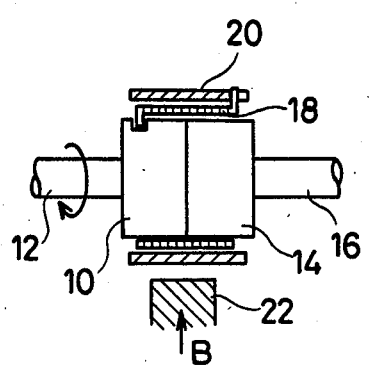
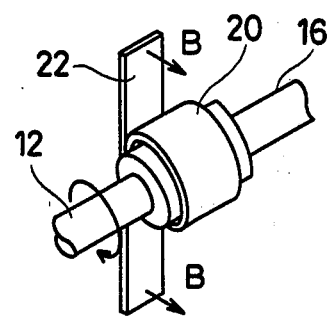
FIG.3 PRIOR ART
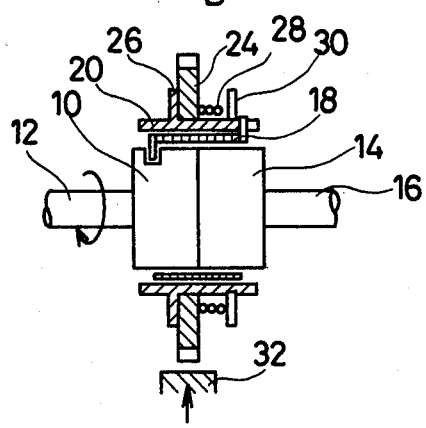
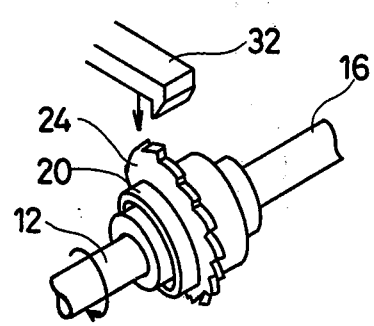
FIG.5 PRIOR ART
FIG.4 PRIOR ART

SPRING CLUTCH MECHANISM

BACKGROUND AND SUMMARY OF THE INVENTION

The present invention relates to a spring clutch mechanism for transferring the rotation in an electrophotographic copying machine.

An electrophotographic copying machine employs a clutch mechanism for driving an original carrier or an exposure system. A typical construction for driving an original carrier in an electrophotographic copying machine is disclosed in U.S. Pat. No. 4,108,544, DRIVING MECHANISM FOR TRAVELLING ORIGINAL CARRIER IN AN ELECTROPHOTOGRAPHIC COPYING MACHINE, issued on Aug. 22, 1978. The conventional spring clutch mechanism requires a considerably large force to activate the clutch mechanism. Thus, the system becomes complicated, and the response is considerably slow in the conventional system.

Accordingly, an object of the present invention is to provide a spring clutch mechanism of a simple construction.

Another object of the present invention is to provide a spring clutch mechanism which requires a slight force to activate the clutch mechanism.

Still another object of the present invention is to provide a spring clutch mechanism which shows a rapid response.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a coil spring is disposed around coaxially disposed bosses of a driving shaft and a driven shaft. One end of the coil spring is fixed to the boss of the driving shaft. A first sleeve is disposed around the coil spring. A second sleeve is slidably secured to the first sleeve so that the second sleeve is slidable on the first sleeve in the axial direction and rotates in unison with the first sleeve. A clutch activating force is applied to the second sleeve in the axial direction in order to push the second sleeve toward a flange portion of the boss of the driven shaft.

In the non-transmitting mode, the boss of the driving shaft is driven to rotate by the drive source. The coil spring, the first sleeve and the second sleeve rotate in unison with the rotation of the boss of the driving shaft. However, the driven shaft does not rotate. To transfer the rotation of the driving shaft to the driven shaft, the clutch activating force is applied to the second sleeve in the axial direction for pressing the second sleeve against the flange portion of the boss of the driven shaft. Since the boss of the driven shaft is held stationary, the braking force is applied to the second sleeve. Therefore, the rotation of the first sleeve is braked, whereby the coil spring is tightly bound around the bosses of the driving shaft and the driven shaft. In this way, the rotation of the driving shaft is transferred to the driven shaft. The rotation of the driven shaft is stopped when the clutch activating force is removed.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a perspective view of an example of a spring clutch mechanism of the prior art;

FIG. 2 is a sectional view of another example of the spring clutch mechanism of the prior art;

FIG. 3 is a perspective view of the spring clutch mechanism of FIG. 2;

FIG. 4 is a sectional view of still another example of the spring clutch mechanism of the prior art;

FIG. 5 is a perspective view of the spring clutch mechanism of FIG. 4;

DESCRIPTION OF THE PREFERRED EMBODIMENTS

Figure 6:
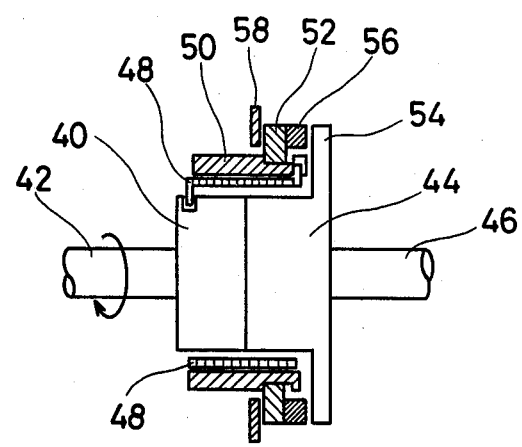
FIG. 6 is a sectional view of an embodiment of a spring clutch mechanism of the present invention showing a non-transmitting mode.

Referring now in detail to the drawings, and to facilitate a more complete understanding of the present invention, typical constructions of the spring clutch mechanism of the prior art will be first described with reference to FIGS. 1 through 5.

Generally, the spring clutch mechanism includes, as shown in FIG. 1, a boss 10 of a driving shaft 12, and another boss 14 of a driven shaft 16. The driving shaft 12 and the driven shaft 16 are coaxially disposed so that the bosses 10 and 14 confront each other. A coil spring 18 is disposed around the bosses 10 and 14, one end of the coil spring 18 being secured to the boss 10.

In the non-transmitting mode, the coil spring 18 rotates in unison with the rotation of the driving shaft 12, but the driven shaft 16 does not rotate. When the braking force is applied to the coil spring 18, a force shown by an arrow A is applied to the coil spring 18 due to the rotation of the boss 10 of the driving shaft 12. Thus, the coil spring 18 is tightly bound around the bosses 10 and 14 to transfer the rotating force of the boss 10 to the boss 14. In this way, the driven shaft 16 is rotated. When the above-mentioned braking force applied to the coil spring 18 is removed, the coil spring 18 is loosened to terminate the transfer of the rotating force of the boss 10 to the boss 14.

FIGS. 2 and 3 show an example of a conventional system to apply the braking force to the coil spring 18. Like elements corresponding to those of FIG. 1 are indicated by like numerals.

A sleeve 20 is disposed around the coil spring 18. The other end of the coil spring 18 is secured to the sleeve 20. A brake plate 22 is provided to depress the sleeve 20 in the direction shown by arrows B in FIGS. 2 and 3. In the non-transmitting mode, the coil spring 18 and the sleeve 20 are rotated in unison with the rotation of the boss 10 of the driving shaft 12. However, the boss 14 of the driven shaft 16 is not rotated. When the brake plate 22 is depressed in the direction B, the coil spring 18 is forced to tightly contact with the boss 14 via the sleeve 20, whereby the braking force is applied to the coil spring 18. Accordingly, the coil spring 18 is tightly bound around the bosses 10 and 14 to transfer the rotating force of the boss 10 to the boss 14.

FIGS. 4 and 5 show another example of a conventional system to apply the braking force to the coil spring 18. Like elements corresponding to those of FIGS. 2 and 3 are indicated by like numerals.

A ratchet wheel 24 is rotatably disposed around the sleeve 20. A supporting plate 26 is integrally secured to the sleeve 20. A spring 28 is disposed between the ratchet wheel 24 and a washer 30 for depressing the ratchet wheel 24 toward the supporting plate 26 with a predetermined pressure. A click 32 is activated to catch the ratchet wheel 24, whereby the frictional force is created between the ratchet wheel 24 and the supporting plate 26 due to the spring 28. The thus created frictional force functions as the braking force applied to the sleeve 20 and the coil spring 18.

The above-mentioned conventional spring clutch mechanism requires a considerably large power to brake the sleeve 20. This braking power functions to slow down the rotation of the driving shaft 12. Further, the clutch mechanism is complicated because the considerably large power is required to brake the sleeve 20. Moreover, the response of the conventional mechanism is not very rapid.

The present invention is to provide a spring clutch mechanism which minimizes the above-mentioned defects. More specifically, the present invention is to provide a spring clutch mechanism which requires a small power to brake the sleeve.

Figure 7:
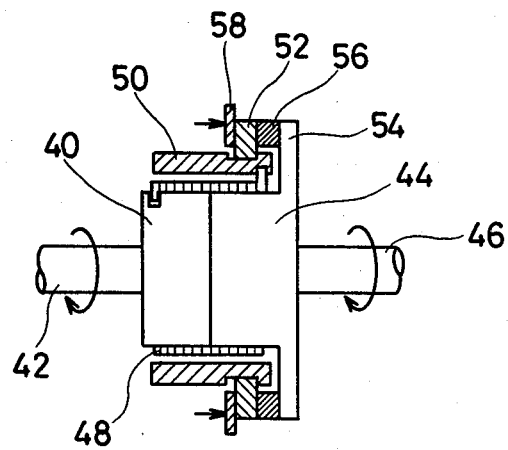
FIG. 7 is a sectional view of the spring clutch mechanism of FIG. 6 showing a transmitting mode.

FIGS. 6 and 7 show an embodiment of the spring clutch mechanism of the present invention, wherein FIG. 6 shows a condition where the rotating power is not transmitted to a driven shaft, and FIG. 7 shows a condition where the rotating power is transferred to the driven shaft.

A boss 40 is secured to a driving shaft 42, and another boss 44 is secured to a driven shaft 46. The driving shaft 42 and the driven shaft 46 are coaxially disposed so that the bosses 40 and 44 confront each other. A coil spring 48 is disposed around the bosses 40 and 44. One end of the coil spring 48 is fixed to the boss 40, and the coil spring 48 is wound around the bosses 40 and 44 with a slight distance therebetween. A first sleeve 50 is disposed around the coil spring 48. The other end of the coil spring 48 is secured to the first sleeve 50. A second sleeve 52 is slidably secured to the first sleeve 50. More specifically, the second sleeve 52 rotates in unison with the first sleeve 50, and the location of the second sleeve 52 is slidable with respect to the first sleeve 50 in the axial direction. A flange 54 is integrally formed at the end of the boss 44. A frictional member 56 such as a rubber plate is secured to the second sleeve 52 to confront the flange 54 of the boss 44. A brake plate 58 is disposed to depress the second sleeve 52 toward the flange 54 of the boss 44. That is, the second sleeve 52 is slided in the axial direction to make the frictional member 56 contact with the flange 54 of the boss 44.

In the non-transmitting mode, as shown in FIG. 6, the frictional member 56 does not contact with the flange 54. The rotation of the boss 40 is transferred to the first sleeve 50 through the coil spring 48. Accordingly, the first sleeve 50 and the second sleeve 52 rotate in unison with the rotation of the driving shaft 42. However, the driven shaft 46 does not rotate.

Under these conditions, when the brake plate 58 is activated to press the second sleeve 52 toward the flange 54, the frictional member 56 contacts the flange 54. Since the boss 44 is held stationary, the frictional force is created between the frictional member 56 and the flange 54. The thus created frictional force functions to brake the second sleeve 52. Since the second sleeve 52 is not rotatable with respect to the first sleeve 50, the rotation of the first sleeve 50 is slowed down. Thus, the coil spring 48 is tightly bound around the bosses 40 and 44 to transfer the rotating force of the boss 40 to the boss 44.

To ensure an accurate operation, the frictional force created between the brake plate 58 and the second sleeve 52 is selected at a value which is negligible as compared with the frictional force created between the frictional member 56 and the flange 54 of the boss 44. Therefore, the braking power derived from the brake plate 58 does not function as a load of rotation. The high frictional force created between the frictional member 56 and the flange 54 ensures a rapid response with a small brake power derived from the brake plate 58.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A spring clutch mechanism comprising:
   a first boss secured to a driving shaft;
   a second boss secured to a driven shaft;
   a coil spring disposed around said first and second bosses, one end of said coil spring being fixed to said first boss;
   a first sleeve disposed around said coil spring, the other end of said coil spring being fixed to said first sleeve;
   a second sleeve slidably mounted around said first sleeve, said second sleeve being slidable with respect to said first sleeve but not rotatable with respect to said first sleeve;
   a flange secured to said second boss and being operatively positioned adjacent to said second sleeve; and
   a depression plate disposed adjacent said second sleeve for depressing said second sleeve toward said flange secured to said second boss.

2. The spring clutch mechanism of claim 1, further comprising a frictional member secured to said second sleeve so that said frictional member contacts said flange when said second sleeve is depressed by said depression plate.

3. The spring clutch mechanism of claim 2, wherein said frictional member comprises a rubber plate.

4. The spring clutch mechanism of claim 1, 2 or 3, wherein said flange is integrally formed on said second boss.

5. A spring clutch mechanism comprising:
   a first rotatable member connected to a driving source;
   a second rotatable member coaxially disposed with respect to said first rotatable member;
   a coil spring disposed around said first and second rotatable members, one end of said coil spring being fixed to said first rotatable member;
   a first sleeve disposed around said coil spring, the other end of said coil spring being fixed to said first sleeve;
   a second sleeve slidably mounted around said first sleeve, said second sleeve being slidable with respect to said first sleeve but not rotatable with respect to said first sleeve;
   a flange member secured to said second rotatable member and being operatively positioned adjacent to said second sleeve; and
   a depression plate disposed adjacent said second sleeve for depressing said second sleeve toward said flange member.

* * * * *

UNITED STATES PATENT AND TRADEMARK OFFICE
CERTIFICATE OF CORRECTION

PATENT NO. : 4,440,280
DATED : April 3, 1984
INVENTOR(S) : Hideaki HAGIHARA

It is certified that error appears in the above-identified patent and that said Letters Patent is hereby corrected as shown below:

In the Heading of the Patent, in the category "Foreign Application Priority Data", change "55-110559" to --55-110559[U]--.

Signed and Sealed this

Tenth Day of July 1984

[SEAL]

Attest:

GERALD J. MOSSINGHOFF

Attesting Officer

Commissioner of Patents and Trademarks